United States Patent [19]

Gosswiller

[11] Patent Number: 4,635,039

[45] Date of Patent: Jan. 6, 1987

[54] LOW DRAG WARNING SYSTEM FOR EMERGENCY VEHICLES

[75] Inventor: Earl W. Gosswiller, Clarendon Hills, Ill.

[73] Assignee: Federal Signal Corporation, Oakbrook, Ill.

[21] Appl. No.: 494,799

[22] Filed: May 16, 1983

[51] Int. Cl.$^4$ ........................... G08B 3/00; E04F 17/04
[52] U.S. Cl. ............................. 340/384 R; 340/384 E; 340/87; 340/88; 340/50; 181/224; 181/143; 181/198
[58] Field of Search ................... 340/84, 81 R, 87, 88, 340/50, 134, 74, 75, 692, 384 E, 384 R; 181/19, 153, 224, 179, 192, 214, 143, 198; 362/217, 362, 363, 35, 74; 296/15; 40/591, 592

[56] References Cited

U.S. PATENT DOCUMENTS

| | | | |
|---|---|---|---|
| 3,404,371 | 10/1968 | Gosswiller | 340/88 |
| 3,789,358 | 1/1974 | Ellis | 340/50 |
| 4,189,709 | 2/1980 | Gosswiller | 340/84 |
| 4,334,211 | 6/1982 | McConnell et al. | 340/88 |

Primary Examiner—Donnie L. Crosland
Attorney, Agent, or Firm—Charles F. Pigott, Jr.

[57] ABSTRACT

A low drag warning system for emergency vehicles having an aerodynamic design reducing turbulent flow past the housing for increased fuel economy and performance. The housing of the warning light system is provided with a pair of light globe compartments possessing an efficient aerodynamic design and a central speaker housing. The speaker housing has a downward sloped speaker grill to create a flow pattern also reducing drag. The air flow is introduced into the speaker housing with a ram effect. Outflow ports from the speaker housing circulate an air flow within the domes to prevent condensation and cool the components therein. The speaker mounted in the housing attains increased sound output using a relatively low power drive.

8 Claims, 4 Drawing Figures

LOW DRAG WARNING SYSTEM FOR EMERGENCY VEHICLES

BACKGROUND OF THE INVENTION

This invention relates in general to warning systems and, in particular, to a low drag warning system for emergency vehicles.

More specifically, but without restriction to the particular use which is shown and described, this invention relates to an improved low drag warning system with speaker employing low drag light domes and a center siren housing having a surface designed to deflect air flow beneath the housing for less turbulence and drag. The system herein disclosed is provided with sound means by which improved sound characteristics are accomplished with a relatively small driver. The invention of the application includes means to circulate a flow of air through the lighting globes in a manner to prevent condensation and effect cooling of the components.

Warning light and siren systems for emergency vehicles generally are designed to project above the roof line of the vehicle. The presence of a housing on the roof of a vehicle inherently imposes air drag which causes the engine to operate with less fuel economy and performance. The speaker housing has been one of the primary sources of air drag in warning systems for emergency vehicles, since it must enclose a speaker having a size sufficient to meet sound standards dictated by various states, particularly stringent in California.

Even the most streamlined of prior art warning systems produces a significant amount of drag due to the turbulence created in the air flow. Prior designs having both lighting globes and a suitable sound system capable of meeting state standards may generate a drag greater then ten pounds at fifty miles per hour with a typical 48" long housing. The imposition of an additional load of this magnitude interferes with the efficient operation of the vehicle. Known designs are also subject to deficiencies in design which prevent extended service-free operation. The formation of condensation in the globe compartment can deteriorate the components as can the build-up of heat. Typical warning systems fail to attack these problems by a simple and straightforward technique.

An emergency system must meet stringent standards of sound propagation to be used in many applications, such as in police vehicles. For certain uses, the State of California, for example, requires an output of sound of 120 decibels at approximately 10 feet in front of speaker and 113 dB at ±50° points. To meet this and other similar standards in various jurisdictions, known speakers have required two high powered, 100 watt drivers.

SUMMARY OF THE INVENTION

It is, therefore, an object of this invention to provide an improved warning system for emergency vehicles.

Another object of this invention is to provide a warning system for emergency vehicles producing reduced air drag.

A further object of this invention is to reduce turbulence of air flow past the housing of a warning system mounted on a roof of an emergency vehicle.

Still another object of this invention is to increase the flow of air beneath the speaker section of an emergency vehicle to reduce turbulence and drag.

A still further object of this invention is to slope the forward surface of a speaker housing of a warning system inward from the top to direct flow to reduce air drag.

A still further object of this invention is to create an air flow into the speaker housing which provides an air pressure pattern reducing drag.

Still another object of this invention is to circulate flow of air through the light globe housings to prevent the formation of condensation and reduce heat build-up.

A still further object of this invention is to provide an improved sound system within a warning system capable of meeting required sound standards with a smaller power driver.

These and other objects are attained in accordance with the present invention wherein there is provided a low drag warning system for emergency vehicles in which the profile of a housing, comprising a pair of lighting globes and a central speaker housing, is designed to minimize air drag. The portions of the housing forming the light globes are aerodynamically designed with a low profile. The central speaker housing is provided with an inwardly sloped front grill into which air is directed and which design causes a large portion of the flow to be directed beneath the housing to create less turbulence and, hence, less air drag. A portion of the air flow is introduced to a back section of the speaker housing and is caused to circulate through the lamp globes in a unique manner to prevent condensation and cool the light bar mechanism for insuring extended service of operation of the system. This improved circulation is created by the relatively positive pressure air in the rear chamber of the speaker being drawn to the relatively negative pressure location of the exhaust openings. These exhaust openings are in a relatively negative pressure area because they are in an area where air is accelerating around the air foil (Bernoulli principle) and because they are in the negative pressure area of a Venturi which is created between the air foil (light bar) and the vehicle roof.

The speaker housing is molded from a foam material and acts also as the speaker projector to eliminate the necessity of a separate speaker projector, while providing a simple construction that is easy to service and inexpensive to manufacture. The improved speaker of the invention is capable of meeting the most stringent sound requirements with a single efficient 100 watt driver.

BRIEF DESCRIPTION OF THE DRAWINGS

Further objects of the invention together with additional features contributing thereto and advantages accruing therefrom will be apparent from the following description of a preferred embodiment of the invention which is shown in the accompanying drawings with like reference numerals indicating corresponding parts throughout, wherein.

DESCRIPTION OF A PREFERRED EMBODIMENT

Figure 1:
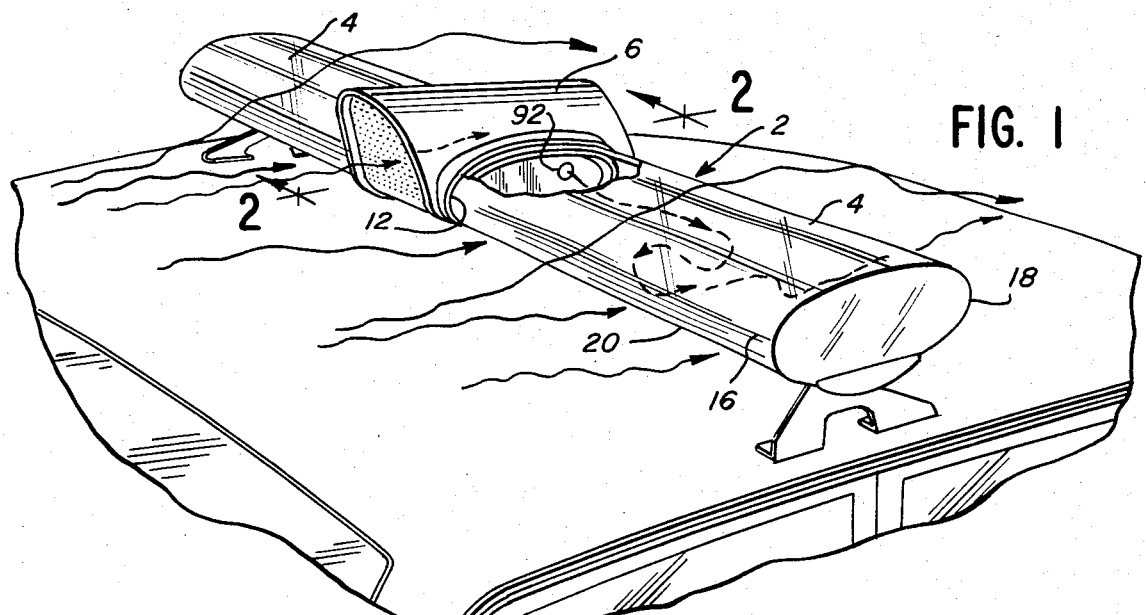
FIG. 1 is a perspective side view of the low drag warning system of the invention mounted upon the roof of an emergency vehicle.
Figure 2:
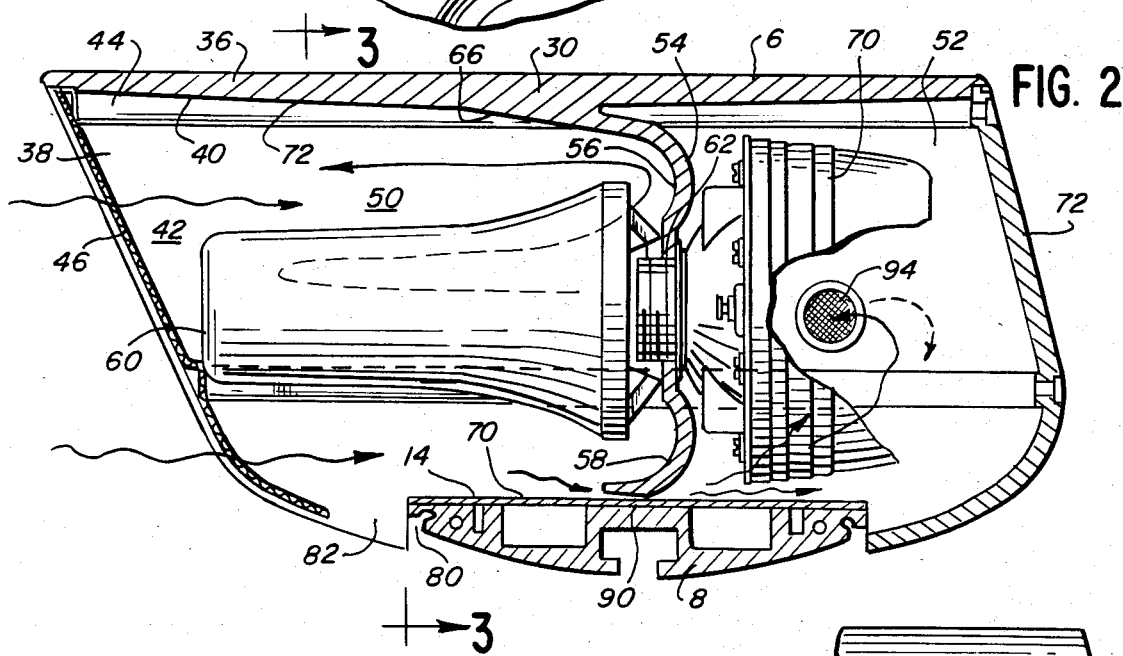
FIG. 2 is an end schematic view, with parts in section, taken along lines 2—2 of FIG. 1.
Figure 3:
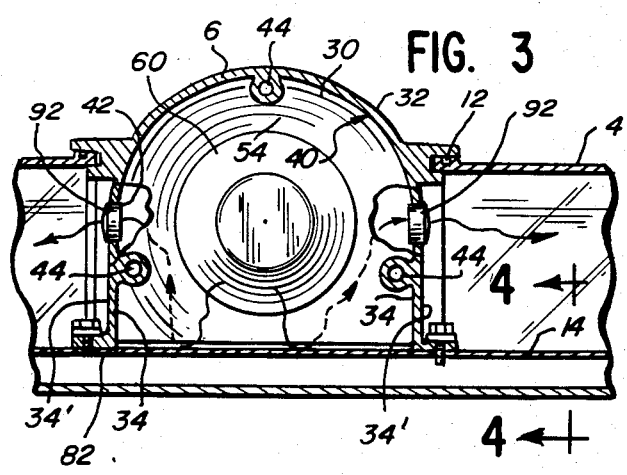
FIG. 3 is a partial front view, with parts in section, of the speaker housing taken along lines 3—3 of FIG. 2.
Figure 4:
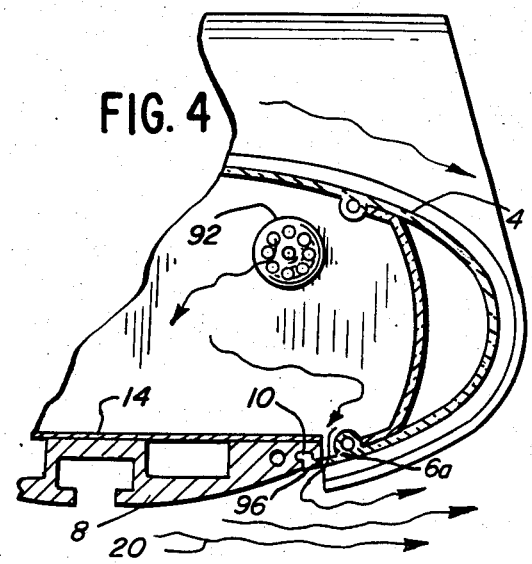
FIG. 4 is a partial end view, with parts in section, of the globe housing of FIG. 1 taken along lines 4—4 of FIG. 3.

Referring now to FIG. 1, there is illustrated the low drag warning system of the invention mounted in operative position upon the roof of an emergency vehicle, such as, for example, a police car and the like. The low drag warning system of FIG. 1 is designated generally by reference numeral 2 and includes a pair of light globe compartments 4 disposed on opposite sides of the central speaker housing 6. The globe housings 4 each may be formed as an integral piece comprising a suitable transparent material, such as, an impact resistant Lexan polycarbonate material and the like. The globe housings 4 and speaker housing 6 are mounted on an extruded base plate 8 as shown in FIGS. 2 and 4 formed from aluminium and the like, which extends substantially the length of the warning system. The base plate 8 interconnects with lower edges 6a of the globe by means of a tongue and groove arrangement 10. The inner end of the lighting globes 4 are carried on an elongated curved slot 12 molded on the exterior sides of the speaker housing 6.

The upper surface 14, carried by the extrusion, 8 centrally acts to support speaker housing 6 and a plurality of rotating light assemblies (not shown) to create a series of light flashes within globes 4. The globe housing 4 is formed as a low profile structure having aerodynamically leading edge portions 16 and trailing edge portions 18. The bottom of the housing is defined by the extrusion 8 forming a relatively smooth flow path 20 between it and the roof of the vehicle because of the smooth aerodynamic design of the housing.

The speaker housing 6 includes a molded foam body housing 30 which serves not only to house a speaker therein, but acts as a speaker projector. The housing body 30 comprises a unitary body having an upper dome 32 with a generally outward semi-circular shape and a pair of sidewalls 34 each having a generally flat outer wall 34'. The walls 36 forming sidewalls 34 and dome 32 generally increase in thickness from open end 38 as seen in FIG. 2. The inner walls 40, 42 then define a sound path for the speaker. A plurality of posts 44 are molded on the inner surfaces 40, 42 and have threaded holes allowing a conventional speaker grill 46 to be attached to open end 38.

The housing body 30 is divided into a front speaker compartment 50 and a rear driver compartment 52 by an integral barrier wall 54. Wall 54 possesses a curved shape having upper and lower concave wall portions 56, 58. A cone tip speaker assembly 60 is mounted on a central portion 61 of barrier 54. The rear driver compartment houses a speaker driver 70, such as, for example, a 100 watt driver which is capable of attaining Class A performance, heretofore only attained with a *pair* of 100 watt drivers, because of the unique speaker design of the invention. The cone tip assembly 60 and driver 70 are threaded together through an opening 62 in barrier wall 54. The rear of the speaker housing includes a back wall 72 which is removable and acts as a door to provide access within the driver compartment. The speaker system within housing 30 may be operated by a suitable amplifier mounted in one of the globes 4. The speaker element of cone 60 generates sound forwardly, then rearwise within cone 50 as shown in FIG. 2 and then in a sound path defined by curved walls 56 and 58, a sloped transitional portion 66 and the inner walls 40, 42 with boundries shown at surfaces 70, 72. The bottom of the housing body includes slotted area 80 to fit over the extrusion platform and has a base portion 82 which is attached thereto.

Air flow encountering the frontal area of the speaker is able to penetrate the grill of the speaker housing and flows inward into the speaker compartment in front of the housing and this builds up a positive pressure in area 50 in front of the housing. The positive pressure build-up, and the shape of the speaker, in effect, causes an increased flow to be directed downward beneath the speaker housing as opposed to an ordinary speaker housing where greater turbulence would be encountered because the flow is unconfined and spills out in all directions. The slope of the grill 46 and the edge of housing adjacent its opening 38 in a downward and inward direction aids in directing greater portions of the air flow beneath the speaker housing and over the roof of the vehicle.

Because of the unique design of the speaker housing 6 of the invention, a substantial amount of the flow is directed downward and beneath the housing for better aerodynamic characteristics and less drag. In one construction of the aerodynamic warning system of the invention shown in FIGS. 1 to 4, it is believed that the unit imposes as little drag as 5 pounds at fifty miles per hour for units of the invention having lengths of 48" and mounted on specified vehicles, although other drag forces would be encountered dependent upon the vehicle, housing length and the like. A drag magnitude of approximately five pounds on the specific vehicle previously mentioned is only about one-half of the drag imposed by prior constructions of similar length and having combined light globes and speaker housings mounted on a comparable vehicle.

The warning system 2 is further provided with a ventilation system in which air under pressure is circulated within the globe compartments 4 for cooling and prevention of condensation. A small opening 90 is provided beneath the barrier wall 54 which directs air under pressure in the rear driver compartment 52. This provides a relatively high static pressure source within the driver compartment 52. A pair of ports 92 are provided through the back sidewalls of the speaker housing and respectively lie in fluid communication with each of the light globes. A suitable filter 94 may be provided over the ports 92 to insure that dirt-free air is introduced into the light globes 4. An outlet port 96 is formed in the bottom of the globes 4 at a point adjacent the back thereof, where negative pressure exists due to the Venturi effect, to draw air from the globes. In effect, air is drawn from the driver compartment in a circulatory path through the light globes to remove condensation and maintain cooling of the lights therein and the like.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A low drag warning system for emergency vehicles comprising:

a housing having a central speaker housing and a pair of lighting globes mounted on each side thereof, said speaker housing including a forward opening exposed to air flow, said air flow entering said opening and acting to create a positive pressure pattern in fron of said speaker housing and directing flow beneath said housing, said opening being covered by a speaker grill permitting the passage of air flow therethrough, upper portions of said speaker grill being positioned forward of lower portions thereof to cause the plane of said speaker grill to slope inwardly in a downward direction, said speaker housing including a front speaker cone compartment receiving said air flow and a rear driver compartment, and a barrier wall separating said front and rear compartments, said barrier wall including port means creating fluid communication between said front and rear compartments, said rear compartment being sealed sufficiently to provide increased static pressure in the rear compartment when a substantial air flow is present passing from front to rear of said warning system.

2. The system according to claim 1, wherein said speaker housing includes port means providing increased pressure between said rear compartment and said lighting globes, said increased pressure creating a circulating flow through said lighting globes, and outflow means provided in said globes for causing said circulating flow in said lighting globes.

3. The system of claim 1 in which said lighting globes are substantially oval in cross section with the major axis of said oval cross section being positioned generally parallel to the normal direction of air flow, and the speaker grill of said central speaker housing being flat.

4. The low drag warning system of claim 3, mounted on the roof of a vehicle in spaced relation thereto to provide a flow path for air between the vehicle roof and the warning system.

5. A low drag warning system for emergency vehicles comprising:

a speaker housing coupled to at least one lighting globe assembly, said speaker housing defining a flat, perforated grill at its forward end, said flat grill of the speaker housing being positioned so that the upper end thereof is positioned forwardly of the lower end to cause said flat speaker grill to slope inwardly in a downward direction, said speaker housing containing a front speaker cone, said low drag warning system being mounted on the roof of the vehicle and spaced therefrom to permit the passage of air between the vehicle and the warning system, whereby flowing air is directed by said speaker grill between said warning system and the vehicle roof in increased quantity to reduce the drag of said warning system during operation.

6. A warning system for emergency vehicles comprising: a housing which defines a speaker housing and at least one lighting globe, said speaker housing defining a forward opening exposed to air flow, a front compartment communicating with said forward opening and containing a speaker cone, a barrier wall separating the front compartment from a rear compartment within said housing, first aperture means within said barrier wall, and second aperture means defined in said housing providing communication between the rear compartment and the exterior, whereby flowing air can pass through said forward opening into the front compartment, and from there through the barrier wall to the rear compartment and from there out of the housing through said aperture means.

7. The system of claim 6 in which said aperture means is provided by a space between said partition and the inner housing wall.

8. The system of claim 6 in which said aperture means communicates between the interior of the speaker housing and the interior of said lighting globe assembly, said lighting globe assembly also defining means permitting venting of the air to the exterior, whereby a continuing flow of air can pass through said lighting globe assembly to prevent condensation therein and providing cooling effect.

* * * * *